April 4, 1950 H. C. KEMPER ET AL 2,502,792
MACHINE TOOL COOLANT GUARD
Filed Dec. 5, 1945 3 Sheets-Sheet 1
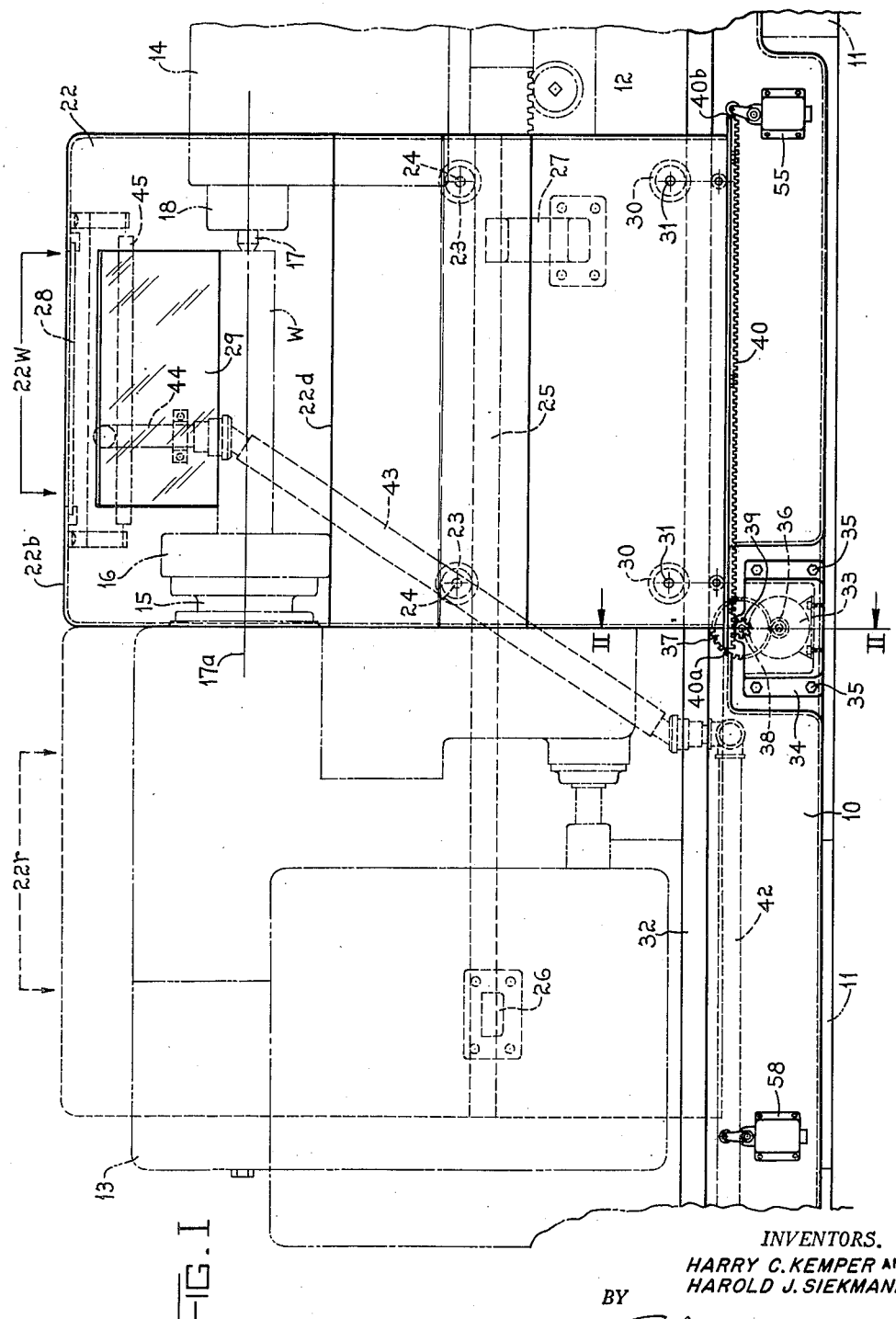
INVENTORS.
HARRY C. KEMPER AND
HAROLD J. SIEKMANN
BY
Toulmin & Toulmin
ATTORNEYS.

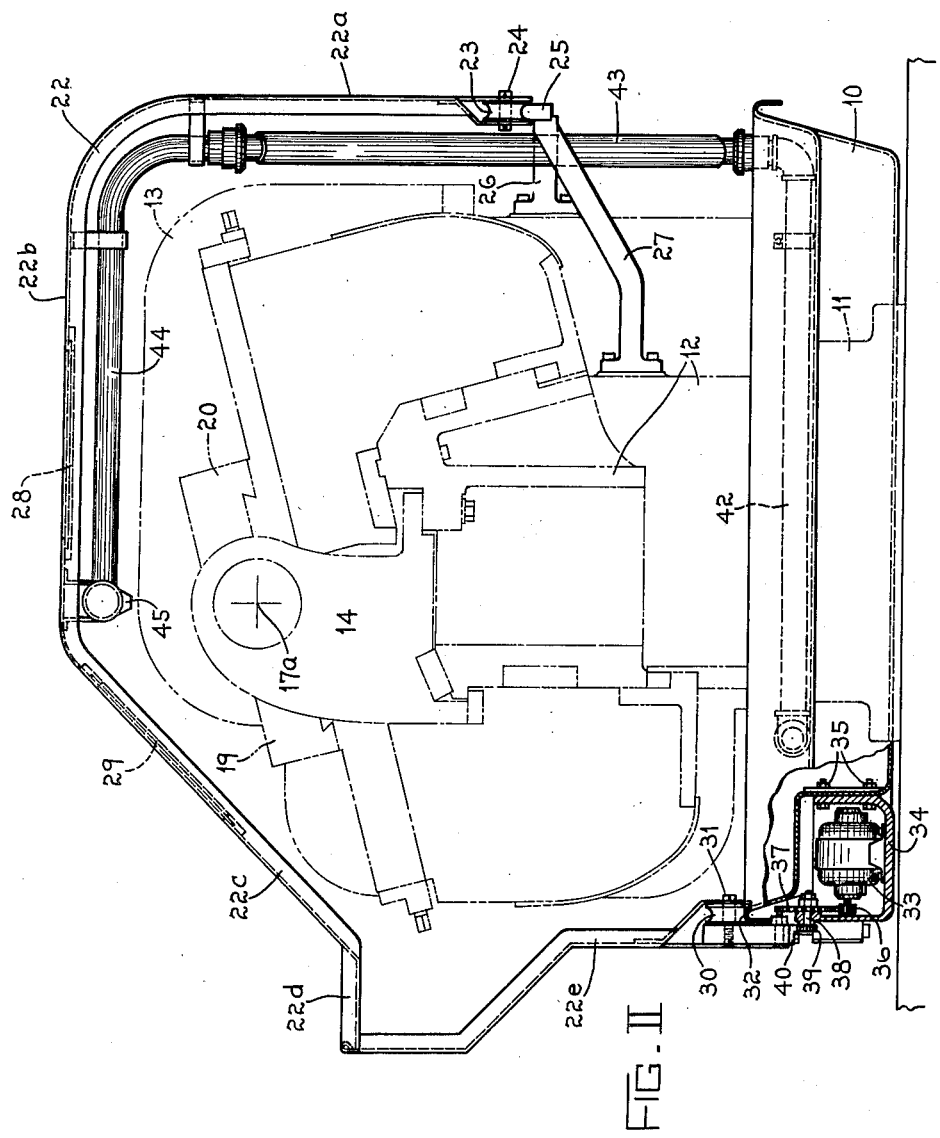

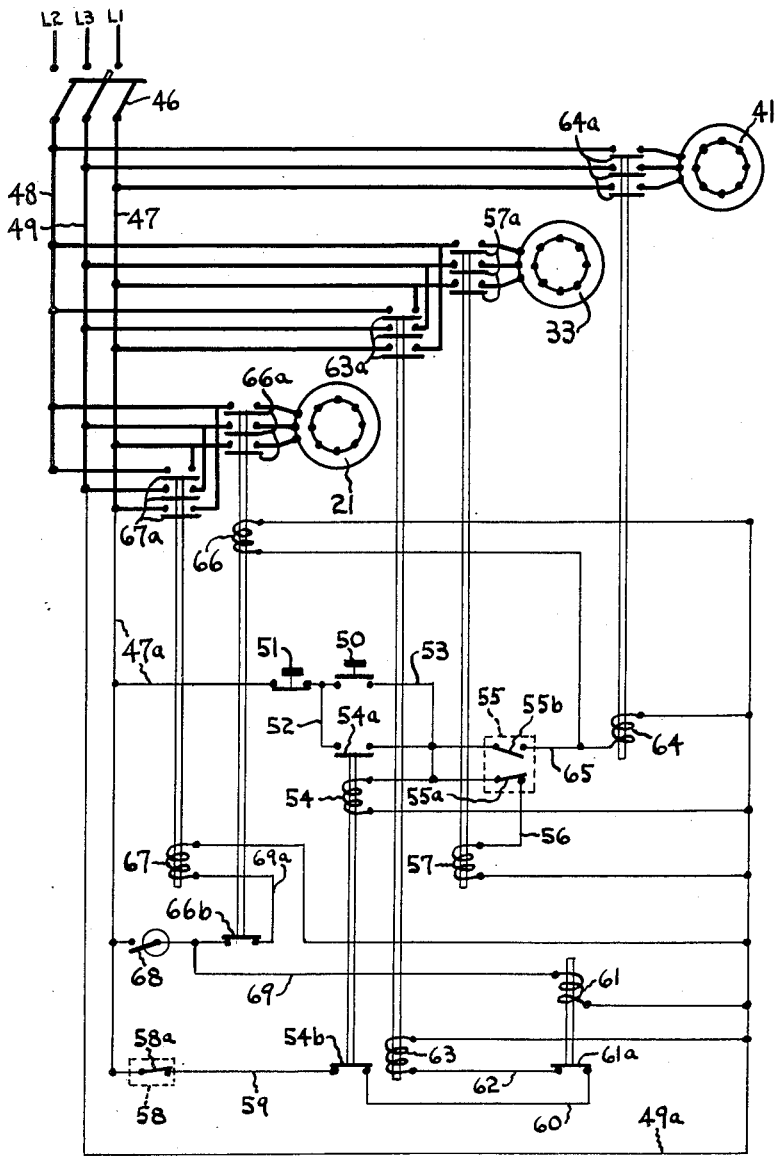
FIG. III

Patented Apr. 4, 1950

2,502,792

UNITED STATES PATENT OFFICE 2,502,792

MACHINE TOOL COOLANT GUARD

Harry C. Kemper and Harold J. Siekmann, Cincinnati, Ohio, assignors to The R. K. Le Blond Machine Tool Co., Cincinnati, Ohio, a corporation of Delaware Application December 5, 1945, Serial No. 632,959

6 Claims. (Cl. 82—34)

This invention pertains to improvements in machine tools and is particularly directed to an improved machine tool coolant guard.

One of the chief difficulties in properly cooling the work and tool in a high production machine tool is to provide a large, adequate, and copious supply of coolant at the point of operation of the tools on the work while at the same time properly confining the coolant against loss by splashing as it impinges upon the work and the tool. Such splashing of the coolant to other portions of the machine tool results in an unsanitary operating condition, a loss of coolant, and annoyance and disturbance to the machine attendant.

In order to properly machine a work piece under high production distortion in the work and the machine structure must be maintained at a minimum. This can only be accomplished by providing a preponderance of coolant over the work, tools, and centers and work holders supporting the work piece during the machining operation while at the same time a coolant guard must be provided which will allow this voluminous application of coolant and confine it to the working area of the machine. Also, such a guard arrangement must not interfere with the efficient handling of the machine by the attendant.

One of the objects of applicants' present arrangement is to provide an improved coolant guard for a machine tool which completely confines a copious supply of coolant to the working area of the machine.

Still another object is to provide an improved coolant guard for a machine tool which may be readily operated with a minimum of effort upon the part of the operator and without interfering with the normal efficient operation of the machine by the attendant.

Another object of this invention is to provide a coolant guard for a machine tool which totally encloses a working area of the machine during the cutting operation and which may be fully retracted away from the cutting area to allow complete access thereto in removing and applying work in the machine tool.

Still another object is to provide a novel coolant guard for a machine tool which may be moved by power to and from the working area of the machine.

Another object is to provide a power operated coolant guard for a machine tool which is actuated in timed relationship with the work cycle of the machine tool.

And a still further object is to provide a coolant guard for a machine tool which is power actuated to and from the working area of the machine in a predetermined timed relationship with the working cycle of the machine.

And still another object is to provide an improved coolant guard for a lathe which may be moved to and from working position to totally enclose the working area of the machine or be removed therefrom to a position over the headstock portion of the lathe to fully expose the working area of the machine.

And finally it is an object to provide a power actuated coolant guard operable in timed relationship with the cutting cycle of the machine.

Further features and advantages of this invention will appear from a detailed description of the drawings in which:

Figure I is an enlarged fragmentary front elevation of a lathe to which this invention is shown applied.

Figure II is an end elevation of the coolant guard of Figure I shown partly in section on the line II—II of Figure I.

Figure III is an elementary electric wiring diagram of the power operating and control mechanism for the lathe and coolant guard.

As an example of an application of this novel coolant guard to a machine tool, there is illustrated a lathe comprising a chip pan 10 which is supported on suitable legs 11 and in which rests the bed 12 of the lathe. On the bed is mounted the usual headstock 13 and tailstock 14. The work spindle 15 in the headstock 13 has a suitable chuck 16 which grips the work piece W which is usually supported on a center 17 in the tailstock barrel 18 of the tailstock 14 on the work axis 17a of the lathe. Appropriate tool feeding devices 19 and 20 are also mounted on the bed and driven from a suitable main drive motor 21 which also operates the work spindle 15 in timed relationship with the movement of the tool feeding devices 19 and 20 as in conventional lathe practice.

The working area of the machine between the headstock and tailstock in which the work is positioned during the machine operation is arranged to be completely covered by a traveling coolant guard 22 which has a rear wall portion 22a in which is journaled a pair of rollers 23 on suitable pins 24. These rollers rest on a rail 25 supported longitudinally of the lathe bed by suitable brackets 26 and 27.

The top horizontal portion 22b of the traveling coolant guard 22 is provided with an observation and light entrance window 28 to give suitable illumination on the work when the guard is moved over the working area of the machine. The guard is provided with an angular downwardly disposed portion 22c in which is provided an observation window 29 through which the attendant may readily observe the cutting operation when the guard is moved into cutting position. A tool tray portion 22d is also formed on the front of the guard adjacent the portion 22c where the operator may keep his various chuck wrenches and machine adjusting tools in readily accessible condition at all times. The front wall portion 22e extends downwardly and has journaled on its lower edge a pair of rollers 30 carried on appropriate studs 31. These rollers travel on the front rim 32 of the chip pan 10 longitudinally of the lathe and parallel to the rear rail 25.

The cover is of unique construction as can be readily observed in Figure II in that the entire series of sections 22a through 22e inclusive completely extend over the top and down each side of the machine tool or lathe frame. By this construction, the guard 22 may be readily moved from the working position 22w, Figure I, to the retracted position 22r in which latter position, the guard is moved over the headstock end of the lathe completely exposing the working area to access by the attendant of the machine.

The traveling coolant guard 22 is actuated in longitudinal movement from working to retracted position or vice versa by means of a suitable power means such as the electric motor 33 which is mounted on a suitable bracket 34 fixed to the chip pan 10 by suitable bolts 35. This motor has a driving pinion 36 which engages a gear 37 fixed to the stud 38 journaled in the bracket 34. The outer end of the stud 38 is provided with a rack pinion 39 which is adapted to engage a rack 40 fixed to the lower edge of the front wall 22e of the cover 22 so that by energizing the motor 33 in one direction or the other the cover may be power driven to either working position or retracted position.

A suitable coolant pump (not shown) driven by a suitable electric motor 41 receives a supply of coolant from the chip pan 10 and transmits it through a pipe line 42 and a flexible connection or hose 43 to the manifold pipe 44 carried in the top of the coolant guard 22 and terminating in the coolant distributing manifold or nozzle 45 provided in the underside of the top of the cover 22. This manifold or nozzle 45 is positioned preferably directly above the work W and allows a voluminous supply of coolant to be poured upon the work piece and cutting tools during the machining cycle.

The movement of the cover 22 by power is effected by electrical operating and control apparatus in a predetermined timed sequence with the operating cycle of the machine tool. Assuming the machine is at rest and the coolant guard 22 is in the retracted position 22r, the operator may then load the work into the chuck 16 and on the lathe center 17. To energize the electrical operating control apparatus, the attendant closes the main line switch 46 connecting the leads 47, 48, and 49 to the power supply leads L1, L2, and L3 of a three-phase alternating current supply source, thereby energizing the conductors 47, 48, and 49.

The work spindle and cutting feed movement is then started by the operator pressing the start push button 50 which momentarily closes its contacts to complete a circuit from the control lead 47a, through the normally closed stop button 51, lead 52, the lead 53, and the relay 54, to the control lead 49a, energizing relay 54 which closes a holding contact 54a so as to maintain the relay 54 energized after the start button 50 has been released. Energizing the relay 54 also opens the normally closed contact 54b. At the same time the relay 54 is energized, a circuit is also completed from the lead 47a through the stop button 51, lead 52, contact 54a, lead 53, through normally closed contact 55a of the limit switch 55, through the lead 56 and the contactor 57, to the lead 49a so as to energize the contactor 57, which in turn closes the associated power contacts 57a to thereby energize the coolant guard actuating motor 33 to cause this motor to move the cover from retracted position 22r toward the work position 22w.

As the guard 22 leaves the retracted position, a limit switch 58, which is engaged by the end 40a of the rack 40 when the cover is in fully retracted position, is released so that its normally closed contact 58a closes to complete a circuit from the lead 47a, through the lead 59, normally closed contact 54b, lead 60, and normally closed contact 61a, the lead 62, and the relay 63 to the lead 49a. When the guard moves from the retracted to work position, contact 54b is opened by the energizing of relay 54 so that the relay 63, which when energized closes power contacts 63a to reverse the motor 33 for moving the cover from working position back to retracted position, is not energized.

When the guard reaches the work position 22w, the end 40b of the rack 40 engages and operates limit switch 55 to open its normally closed contact 55a which de-energizes the contactor 57 and opens the power contacts 57a, de-energizing the guard driving motor 33 bringing the guard to a stop in the working position 22w. At the same time, normally open contact 55b of the limit switch 55 closes to energize the contactor 64 by completing a circuit from the lead 47a, through the stop button 51, lead 52, contact 54a, lead 53, and the lead 65, to the lead 49a.

Energizing the contactor 64 closes power contacts 64a to energize the coolant pump motor 41 to start the flow of coolant from the nozzle 45 onto the work and tools. At the same time, the contactor 66 is energized from lead 65 so that the associated power contacts 66a are closed to energize the main drive motor 21 for rotating the work spindle and actuating the cutting tools for the machining operation.

At the same time the contactor 66 is energized, the normally closed contact 66b is opened so that the contactor 67 will not be energized by the closing of the plugging switch contact 68. The plugging switch contact 68 remains closed due to the rotation of the motor 21 in the forward direction until after the contactor 66 is de-energized to reclose normally closed contact 66b when stopping the main drive motor. The plugging switch contact 68 closes due to the rotation of the motor 21 after it accelerates above a certain predetermined speed to thereby complete the circuit from lead 47a, through lead 69, through relay 61, to cause contacts 61a to open to prevent energizing of the contactor 63 until after the spindle motor 21 again slows down sufficiently when stopping to open the plugging switch contact 68.

To stop the machine, the attendant momentarily presses the stop button 51. This de-energizes the relay 54 and contactors 64 and 66. De-energizing relay 54 opens holding contact 54a so that the stop button may be released and its contacts reclosed while still maintaining relay 54 de-energized. Closing of contact 54b prepares a circuit so that the contactor 63 will be energized when contacts 61a close by de-energizing relay 61. De-energizing of contactor 64 opens power contacts 64a to stop the coolant pump motor and thereby cut off the supply of coolant to the nozzle 45. De-energized contactor 66 opens contacts 66a and closes contact 66b. Opening of contacts 66a de-energizes the spindle motor 21 for forward direction and the closing of contacts 66b completes the circuit to energize the spindle plugging contactor 67 to complete a circuit from the lead 47a, the lead 69, and the lead 69a, through the contactor 67, to the lead 49a, to thereby energize the contactor 67 to close the power contacts 67a to energize the spindle motor 21 for rotation in the reverse direction.

The reversely energized motor 21 develops torque in the reverse direction to bring it quickly to a stop. The spindle plugging contact 68 opens when the speed of the spindle motor 21 drops below a certain value determined by the setting of the plugging switch contact 68. When the contact 68 opens, the contactor 67 and the relay 61 is de-energized. De-energizing the contactor 67 opens its power contacts 67a to de-energize the main drive motor 21 so that it will stop at zero speed and not run in the reverse direction.

The de-energized relay 61 closes its contact 61a so as to complete the circuit to energize the contactor 63, the energizing of which closes contacts 63a to energize the guard actuating motor 33 in the opposite direction so as to retract the cover from the work position 22w to retracted position 22r. As the cover 22 leaves the working position and releases the limit switch 55, its contact 55b will open and its contact 55a will close, thus resetting the circuits to the contactors 64, 66, and 57 for another operating cycle of the machine. When the cover reaches the retracted position and actuates the limit switch 58 to open its normally closed contact 58a, the contactor 63 will be de-energized so as to open the main power contacts 63a and stop the driving motor 33 for the guard to maintain the guard stopped in retracted position. After removing and reloading a new piece of work in the lathe the above cycle may be repeated by again pressing the start button 50.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a coolant guard for a lathe having a bed, headstock and tailstock members defining a work axis for said lathe, and tool feeding devices associated therewith defining a working area of said lathe, the combination of means for mounting said coolant guard for longitudinal movement on the bed of said lathe parallel to said work axis and having side portions extending upwardly each side of said lathe and a top portion interconnecting side portions and extending completely over the headstock portion of said lathe, means for moving said guard from a position over the headstock portion of said lathe to working position intermediate said headstock and tailstock portions and over said tool feeding devices, and a coolant distributing nozzle fixed on the inside top portion of said cover above said work axis, and means for supplying coolant to said nozzle when said cover is moved to the working area intermediate said head and tailstock portions of said lathe including a flexible conduit interconnecting said nozzle with a fixed supply line on the bed of said lathe.

2. In a coolant guard device for a machine tool having a head and tailstock and a working area defined by relatively movable work and tool holding devices including, a power means for effecting said relative movement, and a coolant supply system for said working area of the machine, the combination of a coolant guard movable from a retracted position over said headstock to said working area, power means for moving said guard, a coolant distributing nozzle fixed on said guard associated with the work and cutting tools in said machine tool when the guard is moved to the working area, flexible fluid conducting means between said coolant supply and nozzle for supplying coolant to said nozzle, and common interlocked electrical control mechanism for operating all of said power means in a predetermined operating cycle.

3. In a coolant guard device for a machine tool having relatively movable work holding and tool feeding devices, and power means for effecting said relative movement, the combination of a coolant guard containing a coolant nozzle fixed to the guard and movable therewith from a retracted position to a working position with respect to said work holding and tool feeding devices, a second power means for actuating said guard, a source of coolant supply flexibly connected to said coolant nozzle, and a third power means for delivering said coolant to said nozzle for precipitation on a work piece and the tools of said machine tool.

4. In a coolant guard device for a machine tool having relatively movable work and tool feeding devices, power means for effecting said relative movement, the combination of a coolant guard containing a coolant nozzle fixed to said guard and movable therewith from retracted position to working position with respect to said work and tool holding devices, a second power means for actuating said guard, a source of coolant supply fixed to the frame of said machine flexibly connected to said coolant nozzle, a third power means for delivering said coolant from said source to said nozzle for precipitation on a work piece and the tools of said machine tool, and control means for each of said power means to effect their operation in a predetermined sequential relationship.

5. In a coolant guard device for a machine tool having relatively movable work and tool feeding devices, power means for effecting said relative movement, the combination of a coolant guard containing a coolant nozzle fixed to said guard and movable therewith from retracted position to working position with respect to said work and tool holding devices, a second power means for actuating said guard, a source of coolant supply fixed to the frame of said machine flexibly connected to said coolant nozzle, a third power means for delivering said coolant from said source to said nozzle for precipitation on a work piece and the tools of said machine tool, and control means for each of said power means to effect their operation in a predetermined sequential relationship so that energizing said first power means effects energizing of said second power means to move said guard to working position and wherein movement of said guard to working position operates said third power means to apply coolant to the working area of the machine.

6. In a coolant guard for lathe of inverted U-shape mounted on the lower ends of said U-shape for translation longitudinally of the work axis of said lathe and adapted to be moved from a position over the headstock portion of said lathe to the working position thereof, power means fixed to the bed of said lathe for actuating said guard to and from working position, and coolant supply nozzle means fixed to the inside of said U-shaped member and positioned above the work axis of said lathe, and power operated means fixed on the frame of said lathe and flexibly connected for supplying coolant to said nozzle in response to the relative position of said guard with respect to its working position on said lathe.

HARRY C. KEMPER.
HAROLD J. SIEKMANN.

REFERENCES CITED

The following references are of record in the file of this patent:

UNITED STATES PATENTS

| Number | Name | Date |
| --- | --- | --- |
| 1,851,004 | Donaldson | Mar. 29, 1932 |
| 2,255,739 | Curtis | Sept. 9, 1941 |

FOREIGN PATENTS

| Number | Country | Date |
| --- | --- | --- |
| 406,591 | Great Britain | Mar. 1, 1934 |